United States Patent
Bhatt et al.

(10) Patent No.: US 10,212,104 B1
(45) Date of Patent: Feb. 19, 2019

(54) AUTOMATIC COMMUNICATION FAILURE RECOVERY SYSTEMS

(71) Applicant: Capital One Services, LLC, McLean, VA (US)

(72) Inventors: Japan Bhatt, Plano, TX (US); Maten Mathew Navarifar, Allen, TX (US); Jonathan Ji-Ching Lee, Frisco, TX (US); Bhuvaneswari Balasubramanian, Frisco, TX (US); Vijaya Kumar Pasam, Frisco, TX (US); Spencer Pierce Martin, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/816,479

(22) Filed: Nov. 17, 2017

(51) Int. Cl.
| | |
|---|---|
| G06F 15/16 | (2006.01) |
| H04L 12/58 | (2006.01) |
| H04L 29/08 | (2006.01) |
| G06Q 10/10 | (2012.01) |
| H04M 1/725 | (2006.01) |

(52) U.S. Cl.
CPC ............ *H04L 51/02* (2013.01); *H04L 51/043* (2013.01); *H04L 51/046* (2013.01); *H04L 67/22* (2013.01); *G06Q 10/107* (2013.01); *H04L 67/025* (2013.01); *H04L 67/26* (2013.01); *H04M 1/72552* (2013.01)

(58) Field of Classification Search
CPC ..... H04L 51/02; H04L 51/043; H04L 51/046; H04L 67/22

USPC .......................................................... 709/206
See application file for complete search history.

(56) References Cited

U.S. PATENT DOCUMENTS

| | | | | |
|---|---|---|---|---|
| 8,805,089 | B2 * | 8/2014 | Chang | G06K 9/00 382/218 |
| 9,450,901 | B1 * | 9/2016 | Smullen | H04L 51/046 |
| 9,509,950 | B2 * | 11/2016 | Kobayashi | H04L 12/1818 |
| 2006/0010206 | A1 * | 1/2006 | Apacible | H04M 3/436 709/205 |
| 2012/0317135 | A1 * | 12/2012 | Jin | G06F 17/30165 707/769 |
| 2014/0278582 | A1 * | 9/2014 | Shambach | G06Q 40/08 705/4 |
| 2015/0058429 | A1 * | 2/2015 | Liu | H04L 51/34 709/206 |
| 2016/0042419 | A1 * | 2/2016 | Singh | G06Q 30/0613 705/26.41 |

(Continued)

*Primary Examiner* — Kristie D Shingles
(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform steps of a method for automatic communication failure recovery. The system may receive customer data associated with a customer and generate a message based on the customer data. The system may transmit the message to the customer and upon determining that the customer has failed to engage the message within a predetermined amount of time, the system may monitor an application service to detect when the customer logs in and then generate a communication link between a CSR terminal and the customer's device and cause a communication interface within the application to launch on the customer's device.

19 Claims, 4 Drawing Sheets

(56) References Cited

U.S. PATENT DOCUMENTS

2017/0063763 A1* 3/2017 Hu .................... H04L 51/18
2017/0315680 A1* 11/2017 Yip .................. H04L 65/403

* cited by examiner

AUTOMATIC COMMUNICATION FAILURE RECOVERY SYSTEMS

FIELD OF INVENTION

The present disclosure relates to automatic communication failure recovery systems, and more particularly providing systems for electronically connecting a customer service representative with a customer in response to detecting delivery failure or the absence of read receipts for previously sent messages.

BACKGROUND

Organizations, including service providers and other merchants, frequently need to communicate with customers to inform them of changes to their account, overcharges, missed payments, or other such information that may be pertinent to a particular customer. There are many communication channels available with which an organization may opt to communicate with a customer. For example, an organization may send letters, emails, SMS text messages, push notifications in a mobile application, messages posted on websites, and other such commonly known communication methods. While these communication channels are effective for many customers, other customers often fail to receive or read such messages because they may be filtered as spam, lost in an abundance of similar messages from other organizations, or simply ignored by the customer. When these messages include time-sensitive information about a customer's account, delivering them such that they are received and read in a timely manner becomes increasingly important for the organization and the customer.

To ensure timely delivery of its messages, some organizations have turned to sending duplicate messages through multiple communication channels. This shotgun approach comes with several drawbacks. For example, it can be significantly more expensive. Additionally, while effective for reaching more customers, it still fails to reach other customers because it does not take into account messaging preferences of those customers.

Accordingly, there is a need for improved systems for providing an automatic communication failure recovery system that may detect when a particular communication channel has been unsuccessful in engaging a customer and may switch to another communication channel that is more likely to ensure receipt of the message, such as automatically generating a chat session with a customer service representative upon detecting the customer has logged into a website or mobile application. Embodiments of the present disclosure are directed to this and other considerations.

SUMMARY

Disclosed embodiments provide systems and methods for providing automatic communication failure recovery.

Consistent with the disclosed embodiments, the system may include one or more memory devices storing instructions, and one or more processors configured to execute the instructions to perform steps of a method of providing automatic communication failure recovery. The system may execute the instructions to receive customer data associated with a customer. The system may generate a message based on the customer data. The system may transmit the message to a device associated with the customer. The system may determine that the customer has failed to engage the message within a predetermined amount of time. Subsequent to the predetermined amount of time, the system may monitor an application service associated with the customer and in response to detecting that the customer has logged in to the application service, the system may generate a communication link between a CSR terminal and the device associated with the customer via the application service and cause a communication interface within the application service to launch on the device associated with the customer.

Consistent with the disclosed embodiments, methods and non-transitory computer-readable mediums for providing automatic communication failure recovery are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
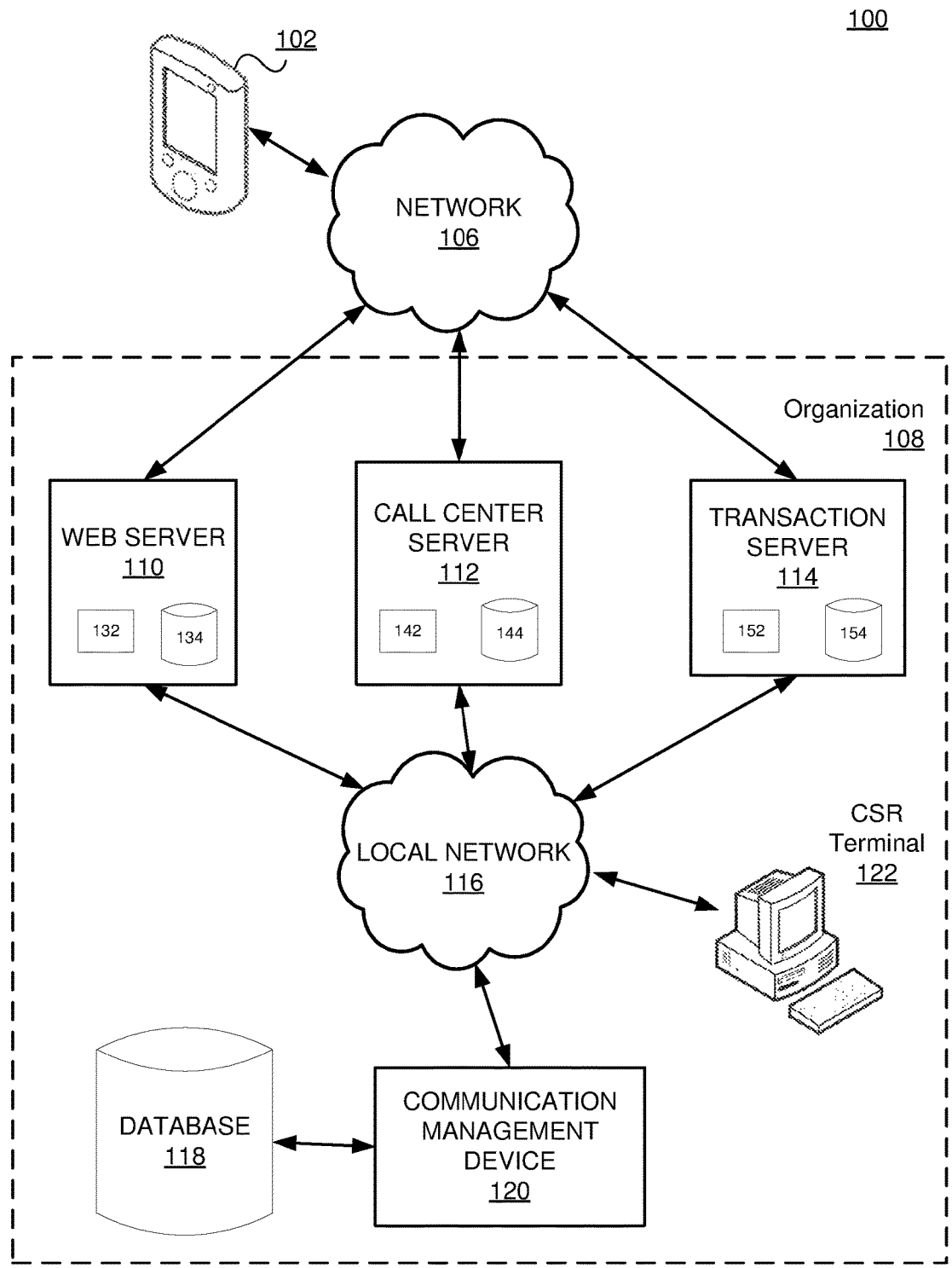
FIG. 1 is a diagram of an exemplary system that may be used to provide automatic communication failure recovery.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing automatic communication failure recovery. The system may include one or more memory devices storing instructions, and one or more processors configured to execute the instructions to perform steps of a method. Specifically, in some embodiments, the system may execute the instructions to receive customer data associated with a customer. The system may generate a message based on the customer data. The system may transmit the message to a device associated with the customer. The system may determine that the customer has failed to engage the message within a predetermined amount of time. Subsequent to the predetermined amount of time, the system may monitor an application service associated with the customer and in response to detecting that the customer has logged in to the application service, the system may generate a communication link between a CSR terminal and the device associated with the customer via the application service and cause a communication interface within the application service to launch on the device associated with the customer.

In another embodiment, a method for providing automatic communication failure recovery is disclosed. The method may include receiving customer data associated with a customer. The method may include receiving a customer communication policy associated with the customer. The method may include generating a message based on the customer data to be sent via a first communication channel, where the first communication channel is selected based on the customer communication policy. The method may include transmitting the message via the first communication channel and determining that the customer has failed to engage the message within a predetermined amount of time. Subsequent to the predetermined amount of time, the method may include determining a second communication channel based on the customer communication policy. The method may further include transmitting the message via the second communication channel.

In another embodiment a non-transitory computer-readable medium for providing automatic communication failure recovery is disclosed. The non-transitory computer-readable medium may store instructions that, when executed by one or more processors, cause a system to receive customer data associated with a customer. The system may generate a message based on the customer data. The system may transmit the message to a device associated with the customer. The system may determine that the customer has failed to engage the message within a predetermined amount of time. Subsequent to the predetermined amount of time, the system may monitor an application service associated with the customer and in response to detecting that the customer has logged in to the application service, the system may generate a communication link between a CSR terminal and the device associated with the customer via the application service and cause a communication interface within the application service to launch on the device associated with the customer.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that may provide automatic communication failure recovery. The components and arrangements shown in FIG. 1 are not intended to limit the disclosed embodiments as the components used to implement the disclosed processes and features may vary. As shown, system 100 may include one or more user devices 102, a network 106, and an organization 108 including, for example, a web server 110, a call center server 112, a transaction server 114, a local network 116, a database 118, a communication management device 120 a customer service representative (CSR) terminal 122.

In some embodiments, a customer may operate user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. In some embodiments, a user device may include or incorporate electronic communication devices for hearing or vision impaired users. User device 102 may belong to or be provided by a customer, or may be borrowed, rented, or shared. Customers may include individuals such as, for example, subscribers, clients, prospective clients, or customers of an entity associated with organization 108, such as individuals who have obtained, will obtain, or may obtain a product, service, or consultation from an entity associated with organization 108. According to some embodiments, user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers.

Organization 108 may include one or more servers, devices, and computer systems for performing one or more functions associated with products and/or services that organization 108 provides. Such servers, devices, and computer systems may include, for example, web server 110, call center server 112, transaction server 114, database 118, communication management device 120, and CSR terminal 122, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from a user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may receive customer communication such as responses to chatbots in web-enabled chat applications, customer service representative instant messages, emails, data entered into an application service such as a website or a mobile application, or any other user input received via a mobile application on a user device 102. According to some embodiments, web server 110 may provide or enable a communication link between CSR terminal 122 and a user device 102, such as, for example, a real time web-enabled chat application and/or instant message application.

Call center server 112 may include a computer system configured to receive, process, and route telephone calls and other electronic communications with a customer operating user device 102. Call center server 112 may have one or more processors 142 and one or more call center databases 144, which may be any suitable repository of call center data. Information stored in call center server 112 may be accessed (e.g., retrieved, updated, and added to) via local network 116 and/or network 106 by one or more devices of system 100. In some embodiments, call center server processor 142 may be used to implement an interactive voice response (IVR) system that interacts with the customer over the phone. In some embodiments, call center server 112 may be configured to make automated phone calls to telephone numbers associated with a customer. For example, call center server 112 may be configured to automatically call a customer's cell phone and play an audible message that was generated by system 100. In some embodiments, call center server 112 may include a text-to-voice capability that enables the conversion of written words into spoken words that may be played by call center server. Accordingly, in some embodiments, call center server 112 may be configured to receive written messages and convert them into spoken messages that may be played to a customer answering a phone call that is auto-dialed by call center server 112.

Transaction server 114 may include a computer system configured to process one or more transactions involving an account associated with a customer, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with organization 108 provides to individuals such as customers. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices of system 100. According to some embodiments, transaction server 114 may store customer data such as account balances, payments, fees, and the like, which may be used in generating events that that are pertinent to a customer or a customer account. For example, if a customer is late in making a payment, system 100 may generate a late payment event that may trigger system 100 to create a message to inform customer of the late payment and populate the message with customer data representative of, for example, the customer's name, the name of the account, the balance on the account, the last payment amount, the accrued fees, and the like.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 108 may communicate via network 106, without a separate local network 116.

According to some embodiments, database 118 may be a database associated with organization 108 and/or its related entity that may store a variety of information relating to customers, transactions, customer information, and business operations. Database 118 may also serve as a back-up storage device and may contain data and information that is also stored on, for example, local databases associated with web server 110, call center server 112, transaction server 114, communication management device 120, or CSR terminal 122. Database 118 may be accessed by other devices and may be used to store records of past interactions, communications, and/or transactions that a particular customer has had with organization 108 and/or its related entity. Further, in some embodiments, database 118 may be used to store customer data and customer account information such as customer identification information (e.g., name, address(es), phone number(s), and the like) account numbers, balances, and payment history.

Communication management device 120 may be or include any device, component, or software that may be configured to management the communication channels used by system 100 to communicate with a particular customer. According to some embodiments, communication management device 120 may store and maintain one or more customer communication policies. Each customer communication policy may be associated with a particular customer. According to some embodiments, a customer communication policy may represent a set of rules for how organization 108 may communicate with the associated customer and which communication channels organization 108 may use. For example, a customer communication policy may indicate a sequence of communication channels to be used in attempting to deliver a message to the customer or in attempting to get the customer to engage with a delivered message. According to some embodiments, communication channels that may be used by organization 108 to attempt to communicate with a customer may include, for example, but not limited to, email, SMS/text messages, push notifications, letters, automated phone calls, website pop-up messages, instant messages, chat messages, bots/automated software applications, or any other type of electronic communication. Accordingly, in an example embodiment, a customer communication policy associated with a particular customer may indicate that the first preferred communication channel is email, the second preferred communication channel is text message, and the third preferred communication channel is an automated phone call. It should be understood customer communication policies may differ from customer to customer.

According to some embodiments, a customer communication policy may be generated based on customer-input preferences, the historical success of each communication channel, and based on patterns of usage. In some embodiments, a customer communication policy may be predetermined by an entity associated with organization 108. An entity associated with organization 108 may for example, have a preferred approach to communication failovers, or may determine a customer communication policy based on other considerations such as regulations, laws, or the costs associated with various communication channels. In some embodiments, communication management device 120 may use machine learning techniques to generate and modify communication policies based on the ongoing success or failure of particular communication channels in various circumstances. For example, communication management device 120 may determine over time that a particular customer is more likely to read an email sent on a weeknight between 6:00 PM and 8:00 PM than any other time, and that the same customer very rarely reads text messages on Sundays. Accordingly, communication management device 120 may generate a communication policy that may dictate what the preferred communication channel for a particular customer is at a given time, day, or in relation to a particular type of message. Customer communication policies may further include rules that dictate when to transition from one communication channel to the next. For example, in some embodiments, a customer communication policy may provide that a message should be sent using a first communication channel (e.g., email) and upon detecting that the customer has not engaged the message within a predetermined amount of time, then system 100 should next attempt to use a second communication channel (e.g., text message) to communication the message.

In some embodiments, communication management device 120 may be configured to detect, or cause to be detected, whether a customer has engaged a message sent by system 100. In other words, communication management device 120 may be configured to detect (or cause to be detected) whether a particular message has been received, opened, viewed, read, listened to, or otherwise processed by the customer. In some embodiments, communication management device 120 may be configured to detect whether an email has been received or open by capturing the customer engagement analytics. These analytics may be captured when an email is delivered, opened, a deep link is clicked, or other features of the email are accessed, viewed, or engaged. For example, in some embodiments, an email may include embedded content (e.g., a link to an image that must be retrieved from web server 110) that may cause a recipient email server to send a message or connect to web server 110 upon the receipt of an email, the opening of an email, or the clicking of a link included in the email. According to some embodiments, web server 110 may be configured to determine that an email was received, an email was opened, and/or a link contained in the email was clicked by a user, as well as the date and time that any such action was taken.

Similar analytics may be available in relation to landline or mobile phone technology that may provide analytics regarding whether a call was answered and how long before the customer hung up, which may be used to determine whether the customer listened to an automated message. For example, in some embodiments, call center server 112 may be enabled to detect when a call has been picked up by the recipient or a voicemail service and may be configured to determine how long the call lasted before being disconnected. Further, analytics may be used to determine whether a voicemail has been played. For example, in some embodiments, a mobile application running on user device 102 may determine that a voicemail from an incoming number associated with call center server 112 and/or organization 108 has been played, and may cause user device 102 to send a message to call center server 112 to report that the message has been played. According to some embodiments, communication management device 120 may be configured to detect whether an automated message delivered by call center server 112 via an automated phone call was received by determining whether the call was picked up. In some embodiments, communication management device 120 may determine whether a text/SMS message sent by system 100 (e.g., originating at communication management device 120) was received and/or opened by receiving receipts from a user device 102 or utilizing analytics tools that may track receipt and read statistics relating to SMS messages. According to some embodiments, communication management device 120 may determine whether a letter was received by a customer by accessing (e.g., via the internet) receipts of a delivery system, such as a common carrier or USPS tracking number that may indicate whether a particular piece of postage or a particular package was delivered. In some embodiments, communication management device 120 may be configured to receive communications from a mobile application installed on a user device that may indicate whether a user has received and/or viewed push notifications. Although the foregoing description provides various examples of capturing customer engagement analytics that indicate a user's engagement with messages sent to the user or user device 102 associated with the user, it should be appreciated that these are merely examples and any method of capturing such analytics known to those of skill in the art may be employed in accordance with the embodiments herein.

CSR terminal 122 may include, but is not limited to, a terminal, a desktop computer, a laptop computer, a mobile device such as a smart phone or tablet device, and any other computerized devices configured to communicate with local network 116 to perform various functions relating to organization 108 such as, for example, receiving telephone calls and conducting teleconferences with customer, engaging in written conversations with customers using a chat, instant messaging, or email program, accessing, viewing, and/or modifying customer data and messages generated by system 100 for customer, and any other functions associated with organization 108's products or services including analyzing individuals' data, placing orders, cancelling orders, issuing credits and refunds, processing withdrawals, deposits, and transfers, and other functions relating to products, services, or accounts associated with customer. CSR terminal may include a graphical user interface (GUI) that enables a customer service representative to view and input changes to customer data and messages generated by system 100.

An employee may operate CSR terminal 122, and the employee may comprise any individual employed by organization 108 or involved in the operations of organization 108 including, for example, a customer service agent, an account manager, a product or service manager, a clerk, etc. Additionally, in some embodiments organization 108 may comprise a plurality of CSR terminals 122 and employees, and various CSR terminals 122 may serve varying functions for organization 108. As an example, a first CSR terminal 122 may provide call center functions for an employee performing the duties of a customer service representative, by, for example holding voice conversations with a customer via call center server 112 (e.g., via voice-over-IP) or written conversations with a customer via web server 110 (e.g., via a chat program). As another example, a second CSR terminal 122 may provide data analytic functions for an employee performing the duties of a data analyst. In both examples, the CSR terminals 122 may access individuals' customer data stored and/or messages generated by system 100 for customer. Customer data may be any data that relates to a customer or customer account, such as, for example but not limited to, names, addresses, contact information, account information, card numbers, balances, account settings, account restrictions, and memos associated with an account.

Although the preceding description describes various functions of a web server 110, call center server 112, transaction server 114, database 118, communication management device 120, and CSR terminal 122, in some embodiments, some or all of these functions may be carried out by a single computing device. For example, in some embodiments, all of the functions of web server 110, call center server 112, transaction server 114 and/or communication management device 120 may be carried out by a single device.

For ease of discussion, embodiments may be described in connection providing automatic failure recovery, and in particular, to attempting communicate with a customer via initiating a direct communication link with the customer upon detecting that the customer has logged into an application service. It is to be understood, however, that disclosed embodiments are not limited to by providing communication failure recovery by monitoring an application service and initiating a communication link with the customer, but rather the embodiments described herein may be applied to providing communication failure recovery by initiating any line of communication with a customer that is expected to lead to a successful delivery of a message. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 2:
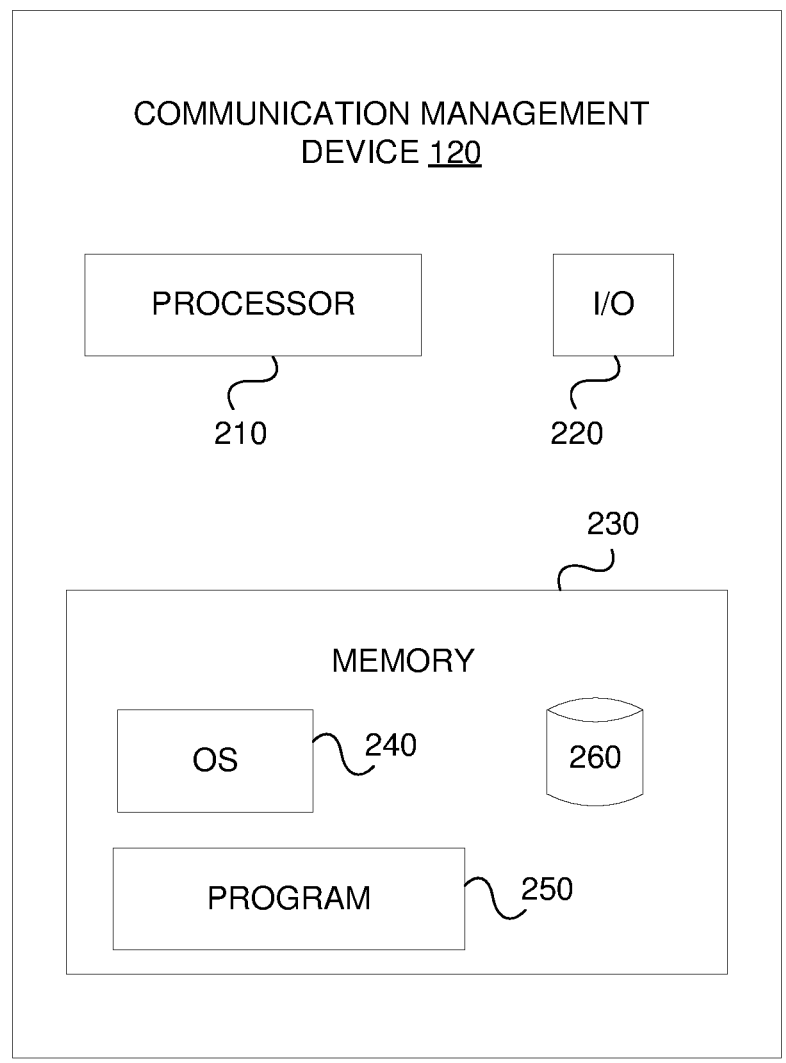
FIG. 2 is a component diagram of an exemplary communication management device.

An exemplary embodiment of communication management device 120 is shown in more detail in FIG. 2. Web server 110, call center server 112, transaction server 114, CSR terminal 122, and/or user device 102 may have a similar structure and may include many components that are similar to or even have the same capabilities as those described with respect to communication management device 122. As shown, communication management device 120 may include a processor 210, an input/output ("I/O") device 220, a memory 230 containing an operating system ("OS") 240 and a program 250. For example, communication management device 120 may be a single device or server or may be configured as a distributed computer system including multiple servers, devices, or computers that interoperate to perform one or more of the processes and functionalities associated with the disclosed embodiments. In some embodiments, communication management device 120 may further include a peripheral interface, a transceiver, a mobile network interface in communication with the processor 210, a bus configured to facilitate communication between the various components of communication management device 120, and a power source configured to power one or more components of communication management device 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Communication management device 120 may include one or more storage devices configured to store information used by processor 210 (or other components) to perform certain functions related to the disclosed embodiments. In some embodiments, communication management device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, communication management device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, communication management device 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, communication management device 120 may include a program that when executed, generates a customer communication policy that may provide instructions on what communication channels to use when attempting to send a message to a customer.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable communication management device 120 to perform one or more of the processes and functionalities associated with the disclosed embodiments.

Communication management device 120 may also be communicatively connected to one or more memory devices (e.g., databases) locally or through a network. The remote memory devices may be configured to store information and may be accessed and/or managed by communication management device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases.

Communication management device 120 may also include one or more I/O devices 220 that may comprise one or more interfaces for receiving signals or input from devices and providing signals or output to one or more devices that allow data to be received and/or transmitted by communication management device 120. For example, communication management device 120 may include interface components, which may provide interfaces to one or more input devices, such as one or more keyboards, mouse devices, touch screens, track pads, trackballs, scroll wheels, digital cameras, microphones, sensors, and the like, that enable communication management device 120 to receive data from one or more users.

In exemplary embodiments of the disclosed technology, communication management device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While web server 110, call center server 112, transaction server 114, system communication management device 120, and CSR terminal 122 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110, call center server 112, transaction server 114, communication management device 120, or CSR terminal 122 may include a greater or lesser number of components than those illustrated.

Figure 3:
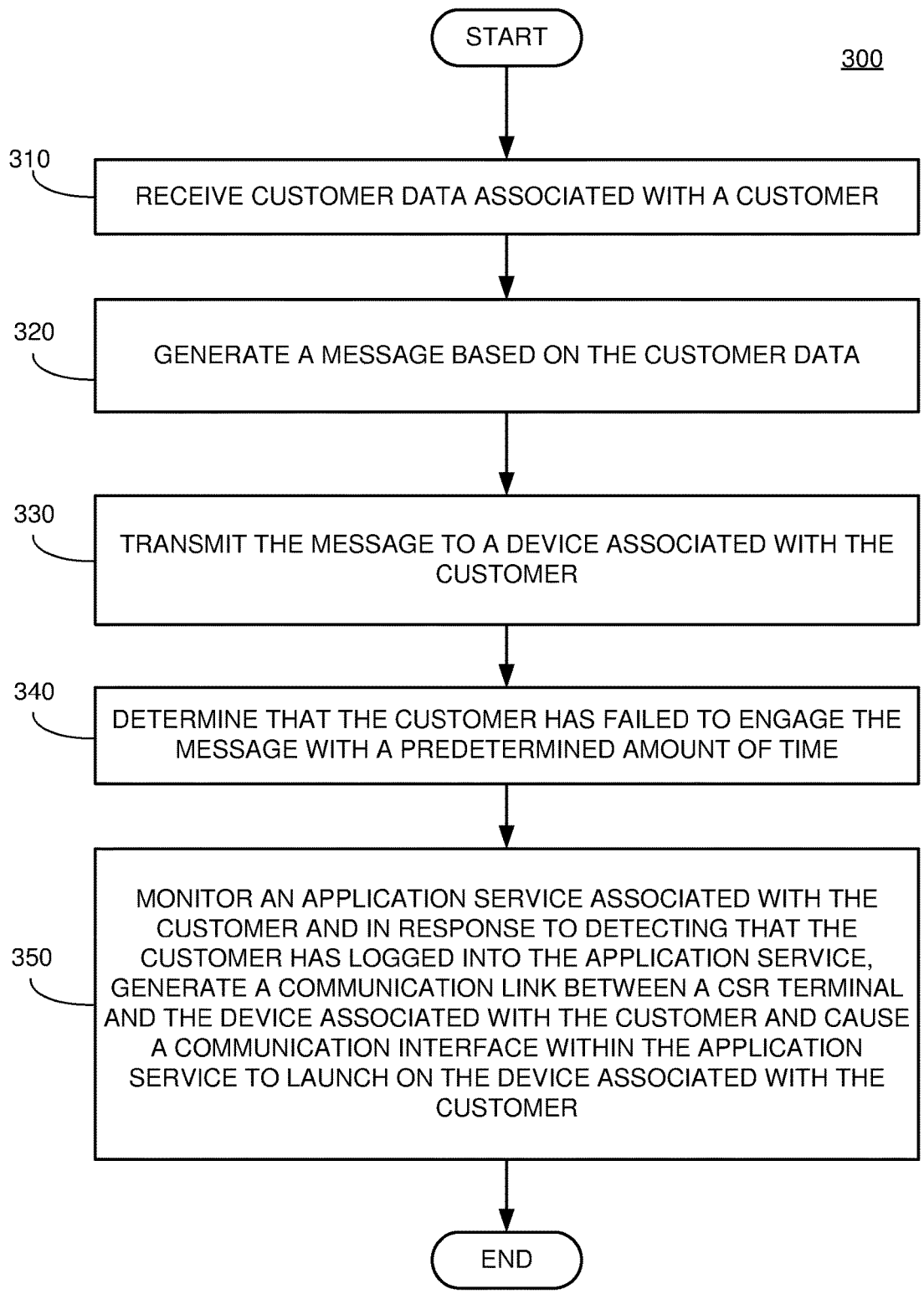
FIG. 3 is a flowchart of an exemplary method for providing automatic communication failure recovery.

FIG. 3 shows a flowchart of a method 300 for providing automatic communication failure recovery. Method 300 may be performed by some or all of web server 110, call center server 112, transaction server 114, database 118, communication management device 120, and CSR terminal 122.

In block 310, the system (e.g., communication management device 120) may receive customer data associated with a customer. Customer data may include customer identification information such as name, address, phone number, identification number, login credentials, and the like. Customer data may also include account information such as account numbers, account balances, payment history, transaction history, auto-payment settings, late payment indications, fees, memos, and other such information that may be commonly referenced in the context of a financial account such as a bank account or credit card account. Customer data may also include event data that may indicate events relating to a customer or a customer's accounts. An event may be something that has occurred in real time that may have an impact on the customer in some way, such as for example, a payment that is due being missed, a fee being charged on an account, an account limit being met, a fraud alert relating to an account, or any other such event that may occur in relation to the provision of financial services or in relation to financial accounts. According to some embodiments, communication management device 120 may receive event data in real time as events occur.

In block 320, system 100 (e.g., communication management device 120) may generate a message based on the customer data. Communication management device 120 may generate a particular type of message based on a particular event that was received by communication management device 120. For example, if communication management device 120 receives event data that indicates that a customer had a payment due and they missed the payment, communication management device 120 may generate a message to inform the customer of the missed deadline for the payment and the fees that are being added as a result. According to some embodiments, messages may be generated by system 100 using predefined message templates that are customized with customer data to include a particular's name, account balance, fees, etc. In this way, communication management device 120 may automatically generate a customized message to the customer regarding an event, to inform the customer of the event and provide pertinent details (e.g., balances, fees, due dates, etc.) about the event.

In block 330, system 100 (e.g., communication management device 120) may transmit the message to a device associated with a customer. For example, communication management device 120 may transmit the message to a user device 102 associated with customer by a particular communication channel selected from one of email, text/SMS message, push notification, or automated phone message (e.g., via call center server 112). According to some embodiments, the communication channel selected by communication management device 120 may be based on a customer communication policy, as previously described above.

In block 340, system 100 (e.g., communication management device 120) may determine that the customer has failed to engage the message within a predetermined amount of time. For example, if the message was sent via email, communication management device 120 may determine that the customer failed to receive and/or open the email within the predetermined amount of time. Similarly, as described above, communication management device 120 may also determine if customer failed to receive, open, read, answer, or listen to a text/SMS message, a push notification, or an automated voice message. According to some embodiments, the predetermined amount of time may be specified in a customer communication policy. In some embodiments, the predetermined amount of time may be designated by an operator of system 100. In some embodiments, the predetermined amount of time may be determined by communication management device 120 using machine learning techniques. Further, in some embodiments, the predetermined amount of time may be based on the type or priority of message. For example, if the message relates to reporting of an account policy change that is to occur in three months, this message may not be urgent and therefore the predetermined amount of time may be large, such as, a number of days. By contrast, if the message relates to a payment that is about to be missed, which may lead to late charges and other fees, this message may be urgent and therefore the predetermined amount of time may be small, such as a number of hours.

In block 350, subsequent to the predetermined amount of time, system 100 (e.g., via web server 110) may monitor an application service associated with the customer to determine when the customer logs into the service. An application service may be, for example, a website application, a mobile application stored on a user device 102, or digital assistant systems, such as a voice-activated digital assistant system that a customer may have in their home. For example, web server 110 may monitor a website account of customer to determine when customer logs into the website. In some embodiments, web server 110 may communicate with a mobile application installed on user device 102 in order to determine when the customer logs into or opens the mobile application. For example, in some embodiments, the act of a user logging into an application service may trigger a notification to web server 110 representing that the user has logged into an account that has been designated for monitoring by system 100. For example, in some embodiments, web server 110 may store a plurality of user records associated with web-based accounts that include user identification information and associated account credentials and communication management device 120 may flag or update a particular record to indicate that system 100 should be notified upon the associated user logging into one or more specified accounts. In some embodiments, the application service may be configured to query a record associated with the login credentials of a user upon receiving the login credentials to determine if the associated account has been flagged or updated to reflect that system 100 is monitoring the account to detect the login of the user, and upon determining that the associated record includes such a flag or update, the application service may send a message to web server 110 to notify system 100 that the user has logged in to the application service. In some embodiments, an application service may be configured to maintain an open connection (e.g., via a TCP session) to web server 110 to receive unsolicited data, such as push notifications. According to some embodiments, system 100 may monitor the application service to determine that a particular user has logged in by sending the application service a message indicating that system 100 has designated the account to be monitored to detect user logins, and the application service may then notify system 100 when the user logs into the account. Although the foregoing describes various ways of monitoring an application service to determine that a user has logged into an account, it should be appreciated that these are merely examples and any method of monitoring accounts to determine that a user is logged in to the account known by those of skill in the art may be utilized in association with embodiments described herein.

According to some embodiments, in response to detecting that the customer has logged in to the application service, system 100 (e.g., communication management device 120) may generate a communication link between CSR terminal 122 and the device associated with the customer and cause a communication interface within the application service to launch on the device associated with the customer. According to some embodiments, generating a communication link between a CSR terminal 122 and the device associated with the customer may comprise enabling an instant messaging link between the CSR terminal 122 and the device associated with the customer (e.g., user device 102), such that, for example, a customer service representative operating CSR terminal 122 may be automatically enabled to electronically communicate with a customer using user device 102 via a chat window. Accordingly, in some embodiments, the communication interface may be a pop-up chat window that may enable a customer to communicate directly with a customer service representative (or an automated chatbot configured to carry out the functions of a customer service representative). In some embodiments, generating a communication link between CSR terminal 122 and the device associated with the customer may comprise receiving at least a portion of the message at the CSR terminal 122 and customer data, so that, for example, a customer service representative operating CSR terminal 122 may be presented with information to communicate with customer about. For example, if the original message sent to customer (e.g., via email) was regarding an overdue balance of $300, CSR terminal 122 may receive data indicating the name of the customer, their account information, and a message indicating that the customer has an overdue balance of $300, so that customer service representative may communicate with the customer regarding the overdue balance. In this way, system 100 enables a customer service representative to engage the customer in real time to discuss the contents of a message that was previously sent to customer via other communication channels but never received or read by the customer.

According to some embodiments, the message of method 300 may be a first message that is sent via a first communication channel, and method 300 may further include receiving a customer communication policy associated with the customer, selecting the first communication channel and a second communication channel based on the customer communication policy, and prior to monitoring the application service and generating a communication link between CSR terminal 122 and the device associated with the customer via the application service, generating a second message based on the customer data, transmitting the second message via a second communication channel, and determining that the customer has failed to engage with the second message within a second predetermined amount of time. In other words, according to some embodiments, a customer communication policy may instruct system 100 to attempt communicating the message to the customer using multiple different communication channels before resorting to monitoring the application service in an attempt to connect with the customer in real-time. The first and second communication channels may each by one of email, text message, push notification, or an automated phone message. In some embodiments, a customer communication policy may instruct system 100 to send a message over multiple communication channels simultaneously.

Figure 4:
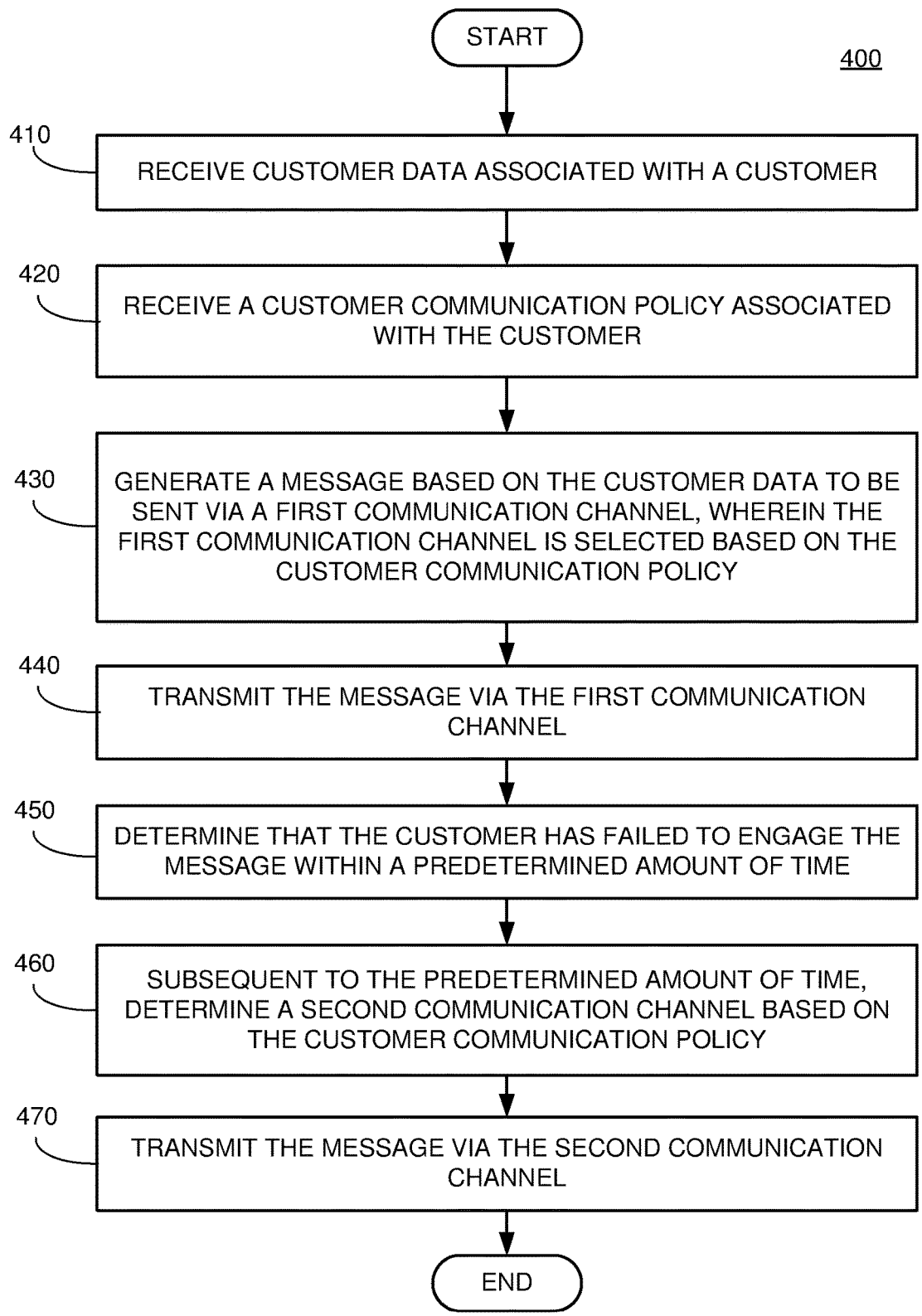
FIG. 4 is a flowchart of another exemplary method for providing automatic communication failure recovery.

FIG. 4 shows a flowchart of a method 400 for providing automatic communication failure recovery. Method 400 may be performed by some or all of web server 110, call center server 112, transaction server 114, database 118, communication management device 120, and CSR terminal 122.

In block 410, system 100 (e.g., communication management device 120) may receive customer data associated with a customer, in a manner similar to block 310 described above. According to some embodiments, customer data may include event data and may be received in response to the occurrence of an event. For example, if a customer misses a payment, system 100 (e.g., transaction server 114) may generate an event that signifies the occurrence of the missed payment and may transmit event data representing the event to communication management device 120.

In block 420, system 100 (e.g., communication management device 120) may receive a customer communication policy associated with the customer. As described previously, a customer communication policy may include a set of rules that may govern how system 100 or organization 108 communicates with a customer. In some embodiments, the customer communication policy may specify the use of different communication channels in different circumstances. In some embodiments, the customer communication policy may specify the use of different communication channels in a particular sequence, with the next communication channel in the sequence being automatically activated after detecting that the first communication channel failed. A communication channel may be considered to have failed if communication management device 120 detects that a customer failed to engage the message. According to some embodiments, failure to engage the message may mean that the customer has failed to receive the message or that the customer has failed to open, read, and/or listen to the message.

In block 430, system 100 (e.g., communication management device 120) may generate a message based on the customer data to be sent via a first communication channel. According to some embodiments, the first communication channel may be selected based on the customer communication policy. The first communication channel may be, for example, email, text/SMS message, push notification, mail, or an automated phone message. In some embodiments, the first communication channel may be selected to be the communication channel that has the highest likelihood of resulting in a customer engagement with the message or the highest likelihood of a successful message. In some embodiments, a successful message may be considered to be a message that has been received and read or listened to by the customer. In some embodiments, customer communication device 120 may select a communication channel based on the time, data, day of the week, or type of message being sent. For example, a customer communication policy may indicate that a particular customer is more likely to read messages about account policy updates via email than any other communication channel, but the customer communication policy may also indicate that the customer is more likely to view text messages about missed payments or fees via text message than any other communication channel. According to some embodiments, communication management device 120 may detect the amount of time it takes for a customer to open and view a message via different communication channels and may determine what the fastest way of achieving customer engagement with the message is. For example, a customer communication policy may indicate that a customer is likely to read a message that is sent by both email and text message, but may determine that the customer is likely to read the message significantly sooner if it is sent via text message than if it is sent via email, and thus the customer communication policy may indicate that a text message is the preferred communication channel for that customer.

In block 440, system 100 (e.g., communication management device 120) may transmit the message via the first communication channel. For example, if the first communication channel is email then communication management device 120 may send the message to an email address associated with the customer, if the first communication channel is mail then communication management device 120 may cause a letter to be sent to an address associated with the customer, if the first communication channel is text message then communication management device 120 may cause a text message to be sent to a phone number associated with the customer, if the first communication channel is push notification then communication management device 120 may cause a push notification to be generated on a user device 102 associated with the customer, and if the first communication channel is automated phone message then communication management device 120 may cause call center server 112 to call a phone number associated with the customer and play a recorded message. According to some embodiments, in each case, communication management device 120 may format and/or redraft the substance of the message to comport with the communication channel being used. For example, a message sent via email may have a much larger character limit than a message sent via text message, so communication management device 120 may reduce the size of the message by eliminating unnecessary information if it is to be sent via text message. According to some embodiments, communication management device 120 may cause web server 110 to generate an email or push notification when using those communication channels. In some embodiments, communication management device 120 may cause call center server 112 to send a text message or automatically dial a customer's number when using the text message or automated call communication channels. According to some embodiments, communication management device 120 may be linked to a printer that may print letters and/or envelopes to be sent via USPS mail or common carrier.

In block 450, system 100 (e.g., communication management device 120) may determine that the customer has failed to engage the message within a predetermined amount of time, in a manner similar to that described with respect to block 340 above. According to some embodiments, communication management device 120 may update the customer communication policy associated with the customer based on the detected failure of the customer to engage with the message. For example, if the message was sent via email, communication management device 120 may update the customer communication policy to reflect a lower likelihood of achieving a successful engagement with the message if sent via email. According to some embodiments, communication management device 120 may update the customer communication policy based on a success of failure of or more attempts at sending a message to a customer via one or more communication channels. In other words, according to some embodiments, system 100 may continue to learn the best ways of achieving customer engagement with a message over time, and may continue to update the customer communication policy with each successful/failed message sent.

In block 460, subsequent to the predetermined amount of time, system 100 (e.g., communication management device 120) may determine a second communication channel based on the customer communication policy. For example, if system 100 first sends customer the message via email, after determining that the email was not received or not opened, system 100 may select a second communication channel based on the customer communication policy. In this example, the second communication channel may be, for example, text message, letter, push notification, automated phone call, or direct contact using an instant messaging or chat program.

In block 470, system 100 (e.g., communication management device 120) may transmit the message via the second communication channel. According to some embodiments, communication management device 120 may reformat or modify the message before transmitting it via the second communication channel. For example, if the first message was sent via email, and the second communication channel is text message or push notification, system 100 may reduce the size of the message by eliminating unnecessary content or creating abbreviations or other shorthand representations of information so that the message content may be of an appropriate size and format for the selected communication channel.

According to some embodiments, where the second communication channel is an instant message sent via a chat program, method 400 may further include monitoring than application service associated with the customer subsequent to the predetermined amount of time, detecting that the customer has logged in to the application service, and generating a communication link between CSR terminal 122 and a user device 102 used to log in to the application service. In some embodiments, the communication link may enable real-time electronic communication via a chat window. For example, CSR terminal 122 may display a chat window in which a customer service representative may enter text to send to a customer, and user device 102 may display a chat window in which the customer may enter text to respond to the customer service representative. In this way, system 100 may automatically enable a connection between a customer service representative and the customer upon determining that one or more previous attempts at delivering and attempting to get a customer to engage with a message have failed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. A financial service provider, such as a credit card company, may want to communicate a message to a customer about an event relating to the customer's account, such as a missed payment. The system (e.g., system 100) may first auto-generate the message to be sent using templates that are customized with the particular customer's information (e.g., name, balance due, etc.). In order to ensure that the message is received and read by the customer, the system (e.g., via communication management device 120) may transmit the message to the customer or the customer's device using a first communication channel, such as email. The first communication channel may be selected by the system (e.g., via communication management device 120) based on a customer communication policy that dictates the preferred method of communication with a particular customer that is likely to lead to the customer reading the message based on the customer's preferences and past behavior. The system (e.g., via communication management device 120) may then detect whether the customer has received and/or opened the message. If the customer has not received/read the message within a predetermined amount of time, the system (e.g., web server 110) may then begin monitoring the online accounts of the customer to detect the next time the customer logs into the account in order to attempt to communicate with the customer in real time. In response to detecting that the customer has logged into the account, the system (e.g., via communication management device 120) may then present the customer with a pop-up chat window and automatically connect the user to a customer service representative operating a customer service representative device (e.g., CSR terminal 122). At the customer service representative device (e.g., CSR terminal 122), the customer service representative may be presented with customer data and the substance of the message that was previously sent to the customer so that the customer service representative may quickly engage the customer in real-time conversation regarding the subject of the message to ensure that the customer is aware of the subject of the message (e.g., that the customer has missed a payment).

Another use case would be for providing an automatic communication failure recovery system for multiple lines of communication. For example, a customer communication policy may indicate that, in order of preference, the communication channels to be used in communicating with a customer are 1) email, 2) text message, and then 3) push notification. Accordingly, similar to above, the system (e.g., via communication management device 120) may first generate a message to send to the customer and then send the message to the customer via email. After a predetermined amount of time, such as, two days, the system (e.g., via communication management device 120) may detect that the customer has not opened the email. Accordingly, the system may then automatically generate a message using the second communication channel, which in this case, is a text message. Because a text message must be much shorter than an email, the system (e.g., via communication management device 120) may first reformat the message to reduce the number of characters before sending the text message. After a second predetermined amount of time, the system (e.g., via communication management device 120) may detect that the customer has not opened or read the text message and may thus automatically revert to generating a message using the third communication channel indicated by the customer communication policy, which in this case is a push notification. Finally, upon the system (e.g., via communication management device 120) detecting that the customer has not opened or read the push notification message, the system may revert to monitoring an application service to detect when a customer next logs in so that it may attempt to generate an instant messaging connection between the customer and a customer service representative so that the message may be delivered by the customer service representative in real time. With each attempted message sent to the customer, the customer communication policy may be updated to reflect which communication channels are likely to result in the customer reading the message and which are less likely, thereby allowing the system to develop a strategy for the most efficient communication with each particular customer.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A system for providing automatic communication failure recovery, the system comprising:
   one or more processors; and
   a memory in communication with the one or more processors and storing instructions that, when executed by the one or more processors, are configured to cause the system to:
   receive customer data associated with a customer;
   generate a message based on the customer data, the message being associated with an organization;
   transmit the message to a device associated with the customer;
   determine that the customer has failed to actively engage the message within a predetermined amount of time, the predetermined time being based at least in part on an urgency of the message; and
   subsequent to expiration of the predetermined amount of time, monitor an application service associated with both the customer and the organization and in response to detecting that the customer has logged in to the application service:
   generate a communication link between a customer service representative (CSR) terminal and the device associated with the customer via the application service; and
   cause a communication interface within the application service to launch on the device associated with the customer.

2. The system of claim 1, wherein determining that the customer has failed to engage the message comprises determining that the customer has failed to receive the message.

3. The system of claim 1, wherein determining that the customer has failed to engage the message comprises determining that the customer has failed to view the message.

4. The system of claim 1, wherein the application service comprises a website application or a mobile application.

5. The system of claim 1, wherein generating a communication link between a CSR terminal and the device associated with the customer comprises:
   enabling an instant messaging link between the CSR terminal and the device associated with the customer; and
   receiving at least a portion of the message at the CSR terminal.

6. The system of claim 1, wherein the communication interface is a pop-up chat window.

7. The system of claim 1, wherein the message is a first message and is sent via a first communication channel, and further comprising:
   receiving a customer communication policy associated with the customer;
   selecting the first communication channel and a second communication channel based on the customer communication policy; and
   prior to monitoring the application service and generating a communication link between the CSR terminal and the customer's device via the application service:
      generate a second message based on the customer data;
      transmit the second message via a second communications channel; and
      determine that the customer has failed to engage with the second message within a second predetermined amount of time.

8. The system of claim 7, wherein the first and second communications channels are each one of: email, text message, a push notification, or an automated phone message.

9. A method of providing automatic communication failure recovery comprising:
   receiving customer data associated with a customer;
   receiving a customer communication policy associated with the customer;
   generating a message based on the customer data to be sent via a first communication channel, wherein the message is associated with an organization and the first communication channel is selected based on the customer communication policy;
   transmitting the message via the first communication channel;
   responsive to determining that the customer has failed to actively engage the message within a predetermined amount of time, determining a second communication channel based on the customer communication policy, the second communication channel being associated with the organization;
   subsequent to the predetermined amount of time, monitoring an application service associated with the customer;
   detecting that the customer has logged in to the application service;
   generating, via the second communication channel, a communication link between a customer service representative (CSR) terminal and a device used to log in to the application service, wherein the communication link enables real-time electronic communication via a chat window; and
   transmitting the message via the second communication channel.

10. The method of claim 9, wherein determining that the customer has failed to engage the message comprises determining that the customer has failed to receive or read the message.

11. The method of claim 9, further comprising reformatting the message to be sent using the second communication channel.

12. The method of claim 9, further comprising updating the customer communication policy based on a success or failure of one or more attempts at sending a message to a customer via one or more communication channels.

13. The method of claim 12, wherein a successful attempt at sending a message to a customer comprises detecting that the customer has received and read the message.

14. The method of claim 9, where selecting the first communication channel based on the customer communication policy comprises selecting a communication channel that has the highest likelihood in resulting customer engagement with the message.

15. The method of claim 14, wherein the selection of the communication channel depends on one or more of a time, a date, a day of the week, of a type of message.

16. The method of claim 14, wherein customer data includes event data and the customer data is received in response to the occurrence of an event.

17. A non-transitory computer-readable medium storing instructions that, when executed by one or more processors, cause a system to:
   receive customer data associated with a customer;
   generate a message based on the customer data, the message being associated with an organization;
   transmit the message to a device associated with the customer; and
   responsive to determining that the customer has failed to actively engage the message within a predetermined amount of time, monitor an application service associated with both the customer and the organization and in response to detecting that the customer has logged in to the application service:
      generate a communication link between a customer service representative (CSR) terminal and the device associated with the customer via the application service; and
      cause a communication interface within the application service to launch on the device associated with the customer.

18. The non-transitory computer-readable medium of claim 17, wherein determining that the customer has failed to engage the message comprises determining that the customer has failed to receive or read the message.

19. The non-transitory computer-readable medium of claim 17, wherein the application service comprises a website application or a mobile application.

* * * * *